Feb. 8, 1966     D. N. McCARTNEY ETAL     3,233,761
CARGO PALLET STOP
Filed June 3, 1963     4 Sheets-Sheet 1
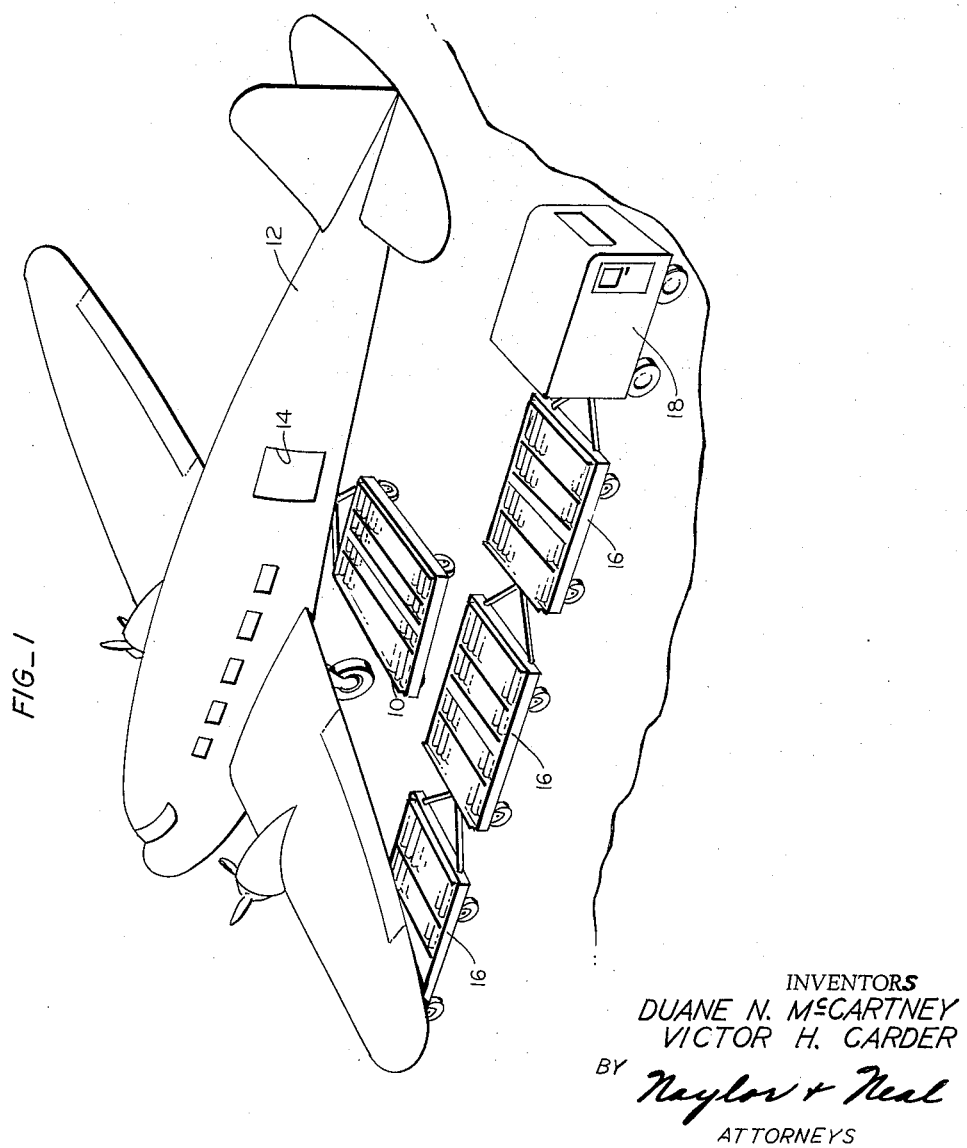
INVENTORS
DUANE N. McCARTNEY
VICTOR H. CARDER
BY *Naylor & Neal*
ATTORNEYS

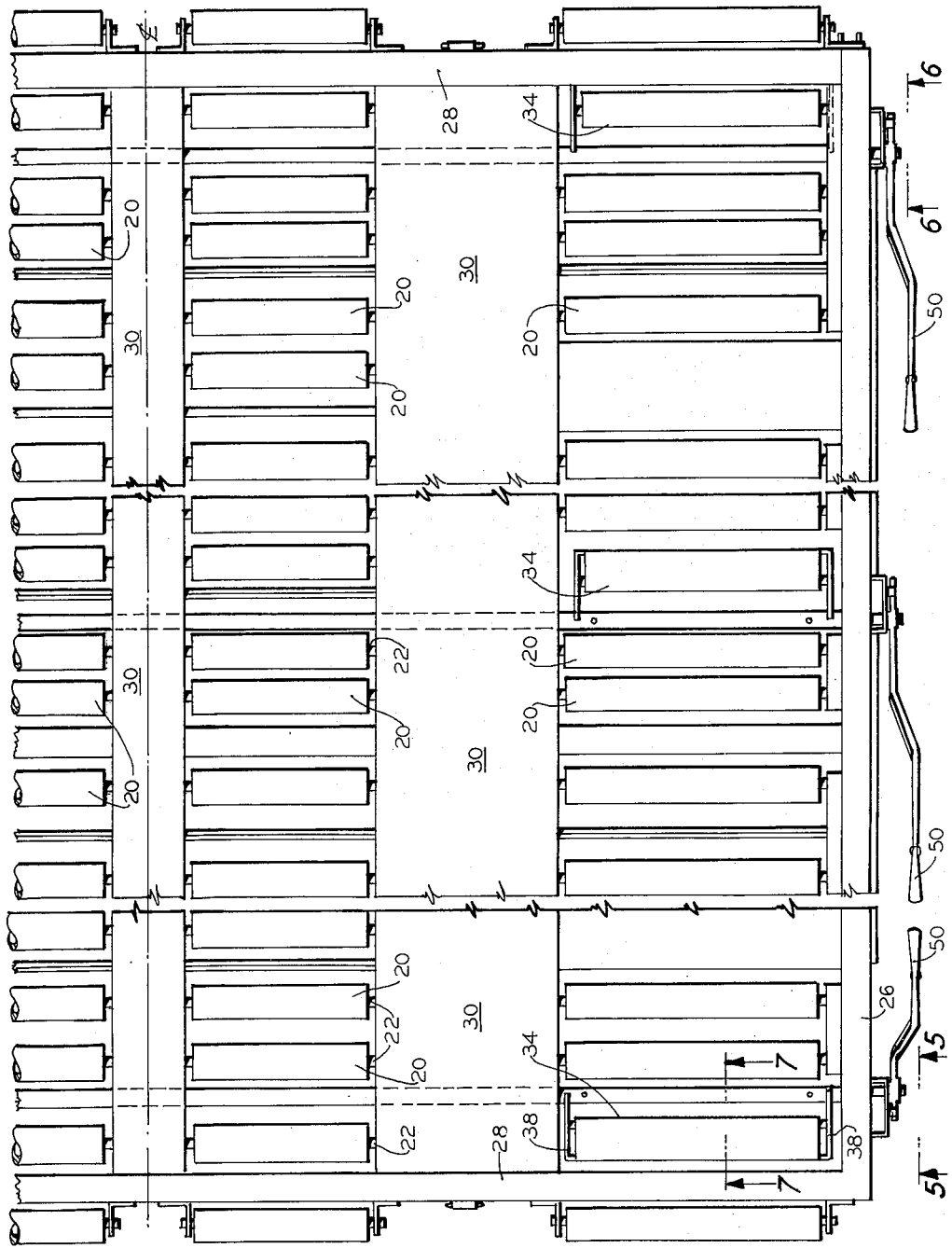

Feb. 8, 1966  D. N. McCARTNEY ETAL  3,233,761
CARGO PALLET STOP
Filed June 3, 1963  4 Sheets-Sheet 3
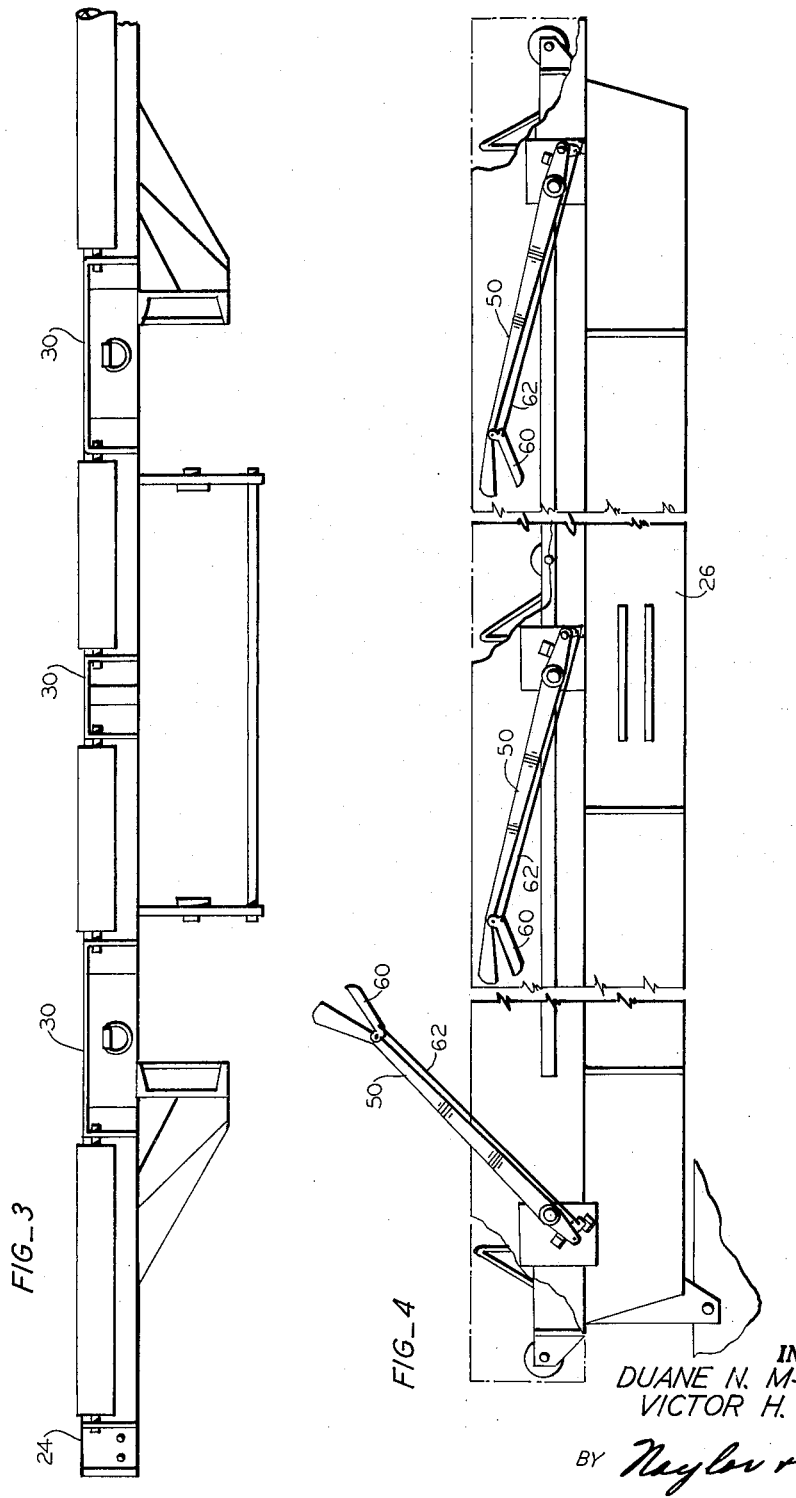
FIG_3
FIG_4
INVENTORS
DUANE N. McCARTNEY
VICTOR H. CARDER
BY Naylor & Neal
ATTORNEYS Feb. 8, 1966   D. N. McCARTNEY ETAL   3,233,761
CARGO PALLET STOP
Filed June 3, 1963   4 Sheets-Sheet 4
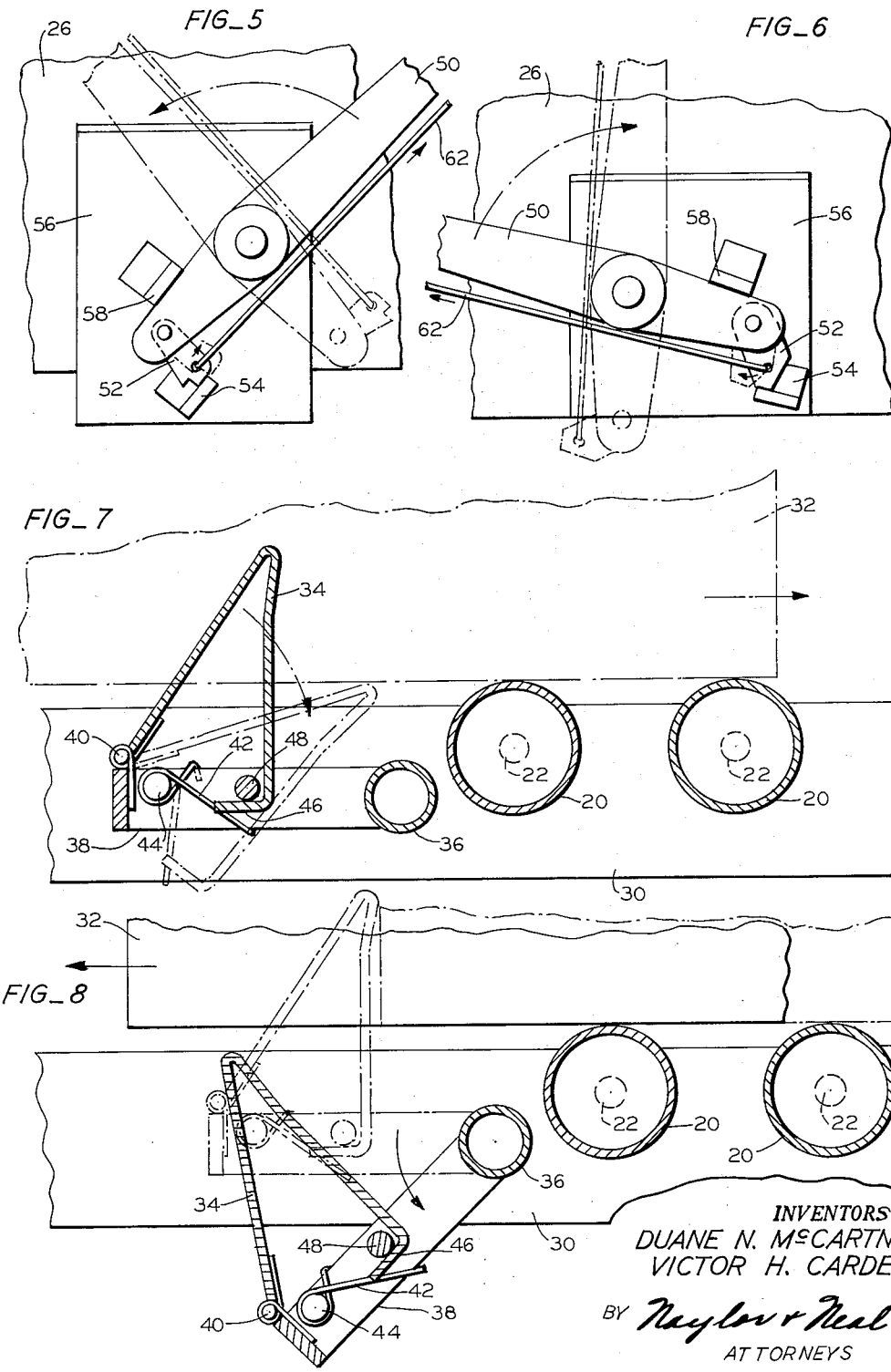
INVENTORS
DUANE N. McCARTNEY
VICTOR H. CARDER
BY Naylor & Neal
ATTORNEYS

United States Patent Office 3,233,761
Patented Feb. 8, 1966

3,233,761
CARGO PALLET STOP
Duane N. McCartney, Pebble Beach, and Victor H. Carder, Pacific Grove, Calif., assignors to American Sugar Company, New York, N.Y., a corporation of New Jersey
Filed June 3, 1963, Ser. No. 286,834
6 Claims. (Cl. 214—84)

This invention relates to cargo transporting equipment and more particularly to trailers for transporting cargo carrying pallets between air terminal buildings and aircraft.

In a copending application of Thomas Herrmann, filed September 25, 1961, Serial Number 140,516, now Patent No. 3,164,274, a new high lift trailer is disclosed for lifting cargo pallets from a position adjacent to the ground to the level of a cargo hatch in an aircraft fuselage. That high lift trailer is parked beside the aircraft and is used together with a train of shuttle trailers to load freight into aircraft where the shuttle trailers are moved sequentially past the high lift trailer; cargo is moved laterally off of each shuttle trailer onto one side of the high lift trailer, and then the cargo is raised to the level of the cargo hatch and is moved off of the opposite side of the high lift trailer into the aircraft. In the operation of the high lift and shuttle trailers, it is necessary to position cargo pallets accurately on the trailers and support them in place rigidly so that the pallets can move off of the trailers only when it is desirable to move them. Additionally, while it is desirable to lock the pallets in place on the trailers, it is desirable to permit transfer of the pallets from one trailer to the other as efficiently as possible.

Accordingly it is an object of this invention to provide improved stop means for positioning cargo on apparatus of this type to permit the cargo to be locked in place securely without substantially interfering with transfer of the cargo when transfer is desired.

It is another object of the invention to provide such stop means which will permit movement of cargo in one direction on a conveying surface while releasably restraining movement in the other direction.

It is another object of the invention to provide cargo transporting trailers such as the high lift and shuttle trailers mentioned above in which such releasable stop means are provided at both ends of the conveying means on the trailer so that cargo can be transferred onto the trailer easily and will be rigidly supported against movement off of the trailer.

Other objects and advantages of the invention will become apparent from thee following description read in conjunction with the attached drawings in which:

FIG. 1 is a perspective view of a train of cargo carrying shuttle trailers being used in conjunction with a high lift trailer;

FIG. 2 is a plan view of one half of one of the shuttle trailers of FIG. 1;

FIG. 3 is a view in side elevation of the trailer of FIG. 2;

FIG. 4 is a view in rear elevation of the trailer of FIG. 2;

FIGS. 5 and 6 are fragmentary views in elevation taken along the planes indicated at 5—5 and 6—6 in FIG. 2, and FIGS. 7 and 8 are sectional views of the trailer of FIG. 2 taken along the plane indicated at 7—7 and illustrating the releasable stop mechanism of the invention in alternative conditions.

Broadly stated, this invention compirses, in apparatus having a frame and a conveying surface thereon defining a conveying path on said frame for the movement of a load along said frame, the improved releasable stop means for positioning a load in said conveying path which comprises support means mounted on said frame adjacent to said path for movement with respect to said path in a predetermined direction from a first position to a second position, latch means latching said support means in said first position with said latch means having selectively operable latch release means permitting said support means to be moved to said second position, a stop member pivotally mounted on said support means for pivotal movement in a second direction when said support means is in said first position from a protruding position in said path to a withdrawn position out of said path with said second direction inclined to said first direction by an angle of at least ninety degrees, and resilient means connected to said stop member for resiliently supporting said stop member in said protruding position while permitting resilient movement of said stop member to said withdrawn position whereby said stop member is withdrawn from said path in opposition to said resilient means by movement of a load in one direction along said path while releasably latching a load against movement in the opposite direction along said path.

Referring now in detail to the drawings and particularly to FIG. 1, a high lift trailer 10 constructed as disclosed in the above mentioned copending application is parked beside an aircraft 12 immediately below the cargo door 14 thereof, and a train of shuttle trailers 16 is pulled past the high lift trailer 10 with the individual trailers 16 positioned sequentially adjacent to the high lift trailer 10 for the transfer of cargo laterally off of the trailer 16 onto the high lift trailer 10 and hence off the opposite side of the high lift trailer 10 into the cargo hatch 14. The top surface of each of the trailers 10 and 16 is provided with anti-friction conveyor means permitting a palletized load to be moved across the trailer easily; as illustrated in FIG. 2, the conveyor means comprises a large number of rollers 20 mounted on top of the trailer for rotation about axles 22 with the axles being positioned longitudinally of the trailer so that the conveyor means moves the palletized cargo laterally of the trailer.

Thus, the trailer has front and rear frame walls 24 and 26 respectively and lateral side walls 28 with intermediate frame members 30 extending between the side frame members 28 and providing with the end frame members 24 and 26 mounting means for the axles 22. The rollers 20 thereby provide a lateral conveying path for the movement of loads 32 across the trailer as indicated in FIGS. 7 and 8.

The loads are positoned on the trailer by means of stop members 34 where a pair of stop members 34 are mounted on each end of the conveyor path, and a pair of stop members 34 is mounted near the center of the conveyor path to facilitate the mounting of narrow pallets on the conveyor. Referring to FIGS. 7 and 8, each pair of stop members 34 is pivotally mounted on the frame of the trailer by means of a tubular member 36 which is pivotally supported on the end members 24 and 26 and the intermediate frame members 30. An arm 38 is mounted on each end of each of the tubular members 36 and pivotally supports one of the stop members 34 by means of a hinge 40 connecting the arm 38 and stop member 34. As indicated in FIGS. 2, 7 and 8, the arms 38 have the form of elongated open channels with the stop members 34 being pivotally movable into the interior of the channels for instance from the full line position in FIG. 7 to the phantom line position in FIG. 7, and a spring 42 mounted on pin 44 engages the stop member 34 to resiliently urge it out of the center space in the arm 38 to a position where a lower flange 46 on the stop member 34 contacts a rod 48 extending transversely of the arm 38.

A manipulating handle 50 is mounted on one end of each of the tubular members 36 for moving the tubular member 36 between a first position in which the stop members 34 thereon project above the conveyor path on the trailer as illustrated in FIG. 7 to a second position where the stop members 34 thereon are withdrawn to positions below the conveyor path thereby permitting free movement of loads in both directions over the top surface of the trailer as shown in FIG. 8. A latch 52 is mounted on the lower end of each of the handles 50 and engages a stop 54 on a bracket 56 on the frame of the trailer to latch the tubular members 36 in the first positions mentioned above (the solid line position of FIG. 7 and the phantom line position of FIG. 8) where the stop members 34 project into the path of cargo on the trailer. Auxiliary stops 58 are mounted on the brackets 56 to engage the arms 50 and hold them in fixed position when the latches 52 are in an engagement with the stops 54, and the handles 50 are provided with conventional spring loaded grips 60 (FIG. 4) and tie rods 62 by which the latches 52 may be released from the stops 54 when desired.

When it is desirable to use the trailers of this invention for transporting palletized cargo, the trailers may be positioned adjacent to a cargo receiving station (for instance the high lift trailer 10), and a load of cargo may be pushed onto the trailer. When the load reaches the opposite side of the trailer or the intermediate stop memers 34, it will contact the vertical surfaces of the stop members 34 at that position and will be restrained from further movement across the trailer, and having passed over the stop members 34 on the loading side of the trailer, the stop members will be moved back to their vertical position by the action of springs 42 to rigidly support the load on the trailer from both sides. When it is desirable to discharge the load from the trailer, the handles 50 may be manipulated to release the latches 52 and rotate the handles upwardly to withdraw the stop members 34 as indicated in FIG. 8 and permit the loads to be moved off of one side of the trailer or the other.

While one specific embodiment of this invention has been illustrated and described in detail herein, it is obvious that many modifications thereof may be made without departing from the spirit and scope of the invention.

We claim:

1. In apparatus having a frame and a conveying surface thereon defining a conveying path on said frame for the movement of a load along said frame, an improved releasable stop means for positioning a load in said conveying path which comprises support means mounted on said frame adjacent to said path for movement with respect to said path in a predetermined direction from a first position to a second position, latch means interconnecting said support means and said frame latching said support means in said first position with said latch means having selectively operable latch release means permitting said support means to be moved to said second position, a stop member pivotally mounted on said support means for pivotal movement in a second direction when said support means is in said first position from a protruding position in said path to a withdrawn position out of said path with said second direction inclined to said first direction by an angle of at least ninety degrees, and resilient means connected to said stop member for resiliently supporting said stop member in said protruding position while permitting resilient movement of said stop member to said withdrawn position whereby said stop member is withdrawn from said path in opposition to said resilient means by movement of a load in one direction along said path while releasably latching a load against movement in the opposite direction along said path.

2. In apparatus having a frame and conveying means thereon defining a conveying path on said frame for the movement of a load along said frame, an improved releasable stop means for positioning a load in said path which comprises support means mounted on said frame underneath said path for pivotal movement in a predetermined direction parallel to said path about a pivotal axis transverse of said path from a first position to a second position, latch means interconnecting said support means and said frame latching said support member in said first position and having selectively operable latch release means permitting said support means to be pivoted to said second position, a stop member pivotally mounted on said support means for pivotal movement on said support means and in a direction opposite to said predetermined direction from a protruding position in said path to a withdrawn position underneath said path, and resilient means connected to said stop member for resiliently supporting said stop member in said protruding position while permitting resilient movement of said stop member to said withdrawn position whereby said stop member is withdrawn from said path in opposition to said resilient means by movement of a load in one direction along said path while releasably latching a load against movement in the opposite direction along said path.

3. The apparatus of claim 2 characterized further in that said support means is pivotally mounted on said frame at a first pivotal axis, said stop member is pivotally connected to said support means at a second pivotal axis spaced away from said first pivoted axis, and said stop member has a load stopping face thereon which, when said stop member is in said protruding position, lies in said conveyor path generally perpendicular thereto between said first and second axes facing toward said first axis.

4. A trailer for transporting cargo from an air terminal building to an aircraft which comprises a chassis having front and rear ends and ground engaging wheels, hitch means on said front and rear ends for attaching a plurality of said trailers in a train to a tractor for pulling said trailers in a forward direction over the ground, conveyor means mounted on top of said chassis for conveying cargo across the top of said chassis perpendicular to said forward direction while resisting movement of cargo on said conveyor means parallel to said forward direction, and resiliently mounted releasable latch means mounted on said conveyor means at opposite sides of said chassis facing toward each other for permitting movement of cargo onto said conveyor means from either end of said conveyor means while releasably latching cargo against movement off of said ends of said conveyor means.

5. A vehicle for transporting cargo which comprises a chassis having ground engaging wheels thereon, conveyor means mounted on top of said chassis and substantially completely covering said chassis for conveying cargo along a path over said conveyor means, and releasable stop means for positioning cargo on said conveyor means comprising support means mounted on said chassis underneath said path for pivotal movement in a predetermined direction with respect to said path about a pivotal axis transverse of said path from a first position to a second position, latch means interconnecting said support means and said chassis latching said support means in said first position and having selectively operable latch release means permitting said support means to be moved to said second position, a stop member pivotally mounted on said support means for pivotal movement on said support means and in a direction opposite to said predetermined direction from a protruding position in said path to a withdrawn position underneath said path, and resilient means connected to said stop member for resiliently supporting said stop member in said protruding position while permitting resilient movement of said stop member to said withdrawn position whereby said stop member is withdrawn from said path in opposition to said resilient means by movement of a load in one direction along said path while releasably latching a load against movement in the opposite direction along said path.

6. A vehicle for transporting cargo which comprises a chassis having ground engaging wheels thereon, conveyor means mounted on top of said chassis and substantially completely covering said chassis for conveying cargo along a path over said conveyor means, and releasable stop means at opposite ends of said path for holding cargo on said path while permitting free movement of cargo onto said conveyor means which comprises a pair of support arms mounted at opposite ends of said conveyor means underneath said path with said arms having inner ends pivotally mounted on said chassis and outer ends movable from first positions adjacent to said path to second positions remote from said path responsive to pivotal movement of said arms, releasable latch means interconnecting said chassis and said arms holding each of said arms in its first position with each of said latch means having selectively operable latch release means permitting said arm to be moved to its second position, a stop member pivotally mounted on the outer end of each of said arms for pivotal movement downwardly toward the first end of said arm from a protruding position projecting into said path when said arm is in said first position to a retracted position withdrawn from said path when said arm is in said first position with each of said stop members positioned on its arm to be withdrawn from said path when it is in said projecting position responsive to movement of said arm to its second position, and resilient means supporting each of said stop members in its projecting position.

References Cited by the Examiner
UNITED STATES PATENTS

| | | | |
|---|---|---|---|
| 582,970 | 5/1897 | Adolph | 214—84 |
| 1,083,777 | 1/1914 | Todd | 280—408 |
| 1,609,315 | 12/1926 | Schraeder et al. | |
| 2,087,846 | 7/1937 | Jahn | 214—84 |
| 2,116,150 | 5/1938 | Howie et al. | 214—84 |
| 2,179,047 | 11/1939 | McMurry | 214—84 |
| 2,623,759 | 12/1952 | Forbas | 188—32 X |
| 2,714,967 | 8/1955 | Olsen | 214—84 X |

GERALD M. FORLENZA, *Primary Examiner.*

HUGO O. SHULZ, *Examiner.*